United States Patent [19]

McCreedy et al.

[11] Patent Number: 4,595,707

[45] Date of Patent: Jun. 17, 1986

[54] MEMBRANES COMPRISING MICROPOROUS STRUCTURE

[75] Inventors: Kathleen M. McCreedy, Midland, Mich.; Edward J. Kramer, Ithaca, N.Y.; Lu H. Tung, Midland, Mich.

[73] Assignee: The Dow Chemical Company, Midland, Mich.

[21] Appl. No.: 700,791

[22] Filed: Feb. 11, 1985

[51] Int. Cl.$^4$ ............................................... C08G 18/14
[52] U.S. Cl. ........................................ 521/62; 521/88; 521/139; 521/140
[58] Field of Search .................... 521/62, 88, 139, 140

[56] References Cited

U.S. PATENT DOCUMENTS 3,909,463 9/1975 Hartman .............................. 521/139
4,430,807 2/1984 Davis et al. .............................. 55/16

*Primary Examiner*—Maurice J. Welsh

[57] ABSTRACT

Membrane compositions useful in filtration and distillation applications are prepared by providing a glassy polymer composition (e.g., polystyrene) optionally having an amount of crosslinking and crazing the polymer composition in the presence of a monomer (e.g., methyl methacrylate) which can graft to said polymer composition. The membrane compositions so prepared comprise a microporous structure wherein the micropores can contain polymeric material. Alternatively, the surface region of the membrane composition and/or the surface region of the micropores has a polymeric material grafted thereto.

29 Claims, No Drawings

MEMBRANES COMPRISING MICROPOROUS STRUCTURE

BACKGROUND OF THE INVENTION

The present invention relates to membrane compositions such as are useful for the separation of gases and for the separation of liquids, and in particular, to methods for preparing such membranes.

Separation processes such as dialysis, ultrafiltration, and reverse osmosis have been used in the separation of a wide variety of impurities from solutions. The development and improvement of membranes for such systems has permitted their use, for example, in the desalination of brackish and saline waters. Further development of membrane technology has prompted the use of such technology for the separation of gases. Thus, it is possible to use certain membranes for the separation of gases, as for example, helium from methane. In addition, membrane technology involving pervaporation processes, membrane distillation and separation in chloralkali cells have been developed.

Common membrane compositions are the cellulose ester membranes which are typically employed in flat sheet or hollow fiber form. The properties of such membranes can be defined in terms of permeation selectivity of components to be separated, permeation flux for one of the components to be separated, and mechanical strength of the membrane composition. The permeation flux is a measure of the rate at which one of the components to be separated permeates through the membrane. Permeation selectivity is an indication of the ratio of the permeation fluxes of the components to be separated. A desirable high permeation flux is typically provided by employing a membrane which is as thin as possible. Unfortunately, such thin membrane compositions typically have poor mechanical strengths and are too weak for practical uses.

Typical processes for preparing such membranes involve providing a microporous structure for support and a dense layer for separation using Loeb-Sourirajan method. Such a method can provide asymmetric membranes which provide many desirable features for component separation. Unfortunately, such a method involves process limitations which are difficult to control, and as noted in U.S. Pat. No. 4,430,807, can often involve the necessity of numerous drying techniques. In addition, the use of such techniques generally involves the requirement that the discriminating layer be of the same material as the support layer. Such a requirement is not always desirable. Furthermore, in the preparation of thin film composites, the adhesion of the discriminating layer to the support can be not as great as would be desirable.

Numerous attempts have been made to improve both the membrane compositions and the processes for their preparation. For example, Henis et al., *Science,* Vol. 220, pg. 11 (1983) disclose a gas separation membrane composition which comprises a coating of silicone rubber in an attempt to cover flaws present in the membrane. Unfortunately, such membrane compositions exhibit poor permeation selectivities in certain applications. Attempts to provide solvent crazed polystyrene microporous membranes by Michaels et al., *Advances in Polymer Science,* Vol. 27 (1978) have proved unsuccessful. In particular, such membranes exhibit a small increase in flux and are too weak for practical uses.

Also of considerable interest are membrane films which are useful in numerous packaging applications. For example, it is highly desirable to provide films with high tensile strengths which are thin, and which are permeable to certain gases (e.g., such as carbon dioxide) and impermeable to other gases (e.g., oxygen). It is particularly desirable that for packaging applications, the film be thermoformable, flexible and weatherable.

In view of the deficiencies of the art, it would be highly desirable to provide a membrane composition and a process for preparing same, which membrane composition exhibits good permeation flux and selectivity, good mechanical strength, and which can be prepared in an efficient and effective manner.

SUMMARY OF THE INVENTION

The present invention is a process for providing a polymer composition suitable for use as a membrane composition, said polymer composition comprising at least one region having a microporous structure, said process comprising
 (a) providing a glassy polymer composition optionally having a functionally effective amount of crosslinking, and
 (b) providing said membrane composition by crazing the polymer composition in an amount sufficient to provide to the polymer composition at least one microporous domain, wherein
 (c) said polymer composition is crazed in the presence of monomers which are polymerizable with said polymer composition during said crazing.

The present invention, in another aspect, is a membrane composition comprising at least one microporous domain; said membrane composition being comprised of (a) a glassy polymer composition optionally comprising a functionally effective amount of crosslinking, and (b) a polymeric domain grafted to at least a portion of the microporous domain of said polymer composition.

Compositions of this invention can comprise, if desired and in addition to said microporous domain, at least one dense domain.

The process of this invention is useful in providing the skilled artisan with a means for providing membrane compositions which are useful in a wide variety of applications. For example, the membrane compositions of this invention are useful for gas separations, liquid separations, ultrafiltration processes, and as substrates for composite membranes. Membrane compositions are useful in reverse osmosis, pervaporation processes, in porous filtration applications, and the membrane distillation processes.

The membrane compositions of this invention can be highly permeation selective, exhibit a desirable high permeation flux, and exhibit good physical strengths. Said compositions are prepared under controllable conditions and exhibit low amounts of flaws.

DETAILED DESCRIPTION OF THE INVENTION

Glassy polymer compositions are polymer compositions which are substantially non-crystalline and are capable of being crazed using chemical means. That is, under conditions at which the process of this invention is performed, the polymer composition is present as an amorphous vitreous state. Glassy polymer compositions can exist in a multiphase structure wherein the continuous phase or major phase is comprised of a glassy polymer in the form of an amorphous vitreous state. The glassy polymer composition can be slightly crystalline. The crystalline polymer portion of the composition can be derived from a rubbery phase in certain situations. Examples of glassy polymer compositions include polystyrene, poly(p-methylstyrene), poly(t-butyl styrene), poly-2-methylpropene, polyvinylchloride, polymethylmethacrylate, styrene acrylonitrile copolymers, styrene butadiene copolymers, acrylonitrile styrene butadiene copolymers (ABS resins), styrene acrylic acid copolymers, styrene isoprene block copolymers, styrene butadiene block copolymers, polysulfones, polyester sulfones, blends of polystyrene and poly(2,6-dimethylphenylene oxide), blends of the foregoing polymers, and the like. Such polymers are desirable because such types of glassy polymers are selective for separation of gases. In addition, when partially crazed, such polymer compositions typically provide a sharp boundary between the crazed region and the non-crazed region.

Glassy polymer compositions can be employed in any of the conventional forms which provide a surface suitable for permselective applications. For example, the glassy polymer compositions can be employed in the form of flat sheets or films (i.e., self supporting films), hollow fibers, spiral wound, etc. The glassy polymer composition can be employed as a film or sheet in a variety of forms ranging from extruded oriented layer to a compression molded layer of low orientation. It is understood that the glassy polymer composition can also provide the microporous structure. When a dense domain is present, it is desirable that the dense domain be in the form of a dense layer which layer is a continuous layer having a minimum amount of flaws. Typically, the dimensions of the glassy polymer compositions which are employed in the process of this invention are such as to provide a membrane composition with a size which is similar to those of conventional membrane compositions. Glassy polymer compositions having total thicknesses ranging from about 5 μm to about 300 μm are typically employed. Optional dense layers having thicknesses from about 0.1 μm or less to about 25 μm are useful, depending upon the glassy polymer composition which is employed. Typically, the thickness of the optional dense core layer (i.e., dense domains) ranges from 0 to about 50 percent of the total thickness of the untreated polymer composition (i.e., the original thickness of the glassy polymer composition prior to crazing).

Glassy polymer compositions can have a functionally effective amount of crosslinking. By this is meant that the glassy polymer composition can crosslink in an amount sufficient to provide an increase in mechanical strength to the membrane composition while not substantially limiting the permeation flux of the membrane composition. The degree of crosslinking which provides such a functionally effective amount of crosslinking can vary, and can range from barely detectable (as, for example, conventional long chain branching) which provides polymer compositions which are soluble in suitable solvents, to relatively great which provides polymer compositions which are essentially insoluble, low swelling gels. The uniformity of crosslinking throughout the thickness of the composition can vary. For example, the uniformity of the crosslinking can be uniform throughout the thickness of the composition. Conversely, the crosslinking can be relatively great at one side of the composition while totally uncrosslinked on the other side of the composition. In such a situation, the gradient of crosslinking between the two extremes can range from gradual to precipitously abrupt.

Crosslinking can be provided to the glassy polymer composition by a variety of techniques. For example, the polymer composition can be irradiated using, for example, UV radiation or electron beam radiation. Radiation sensitive polymers can be modified with various components and subjected to low amounts of irradiation in order to provide crosslinking (for example, dimethylmaleimido modified polystyrene can be coextruded with polystyrene and subjected to UV radiation). Chemical crosslinking provided by reacting moisture sensitive groups attached to the polymer chains can be employed.

A convenient means for crosslinking the glassy polymer composition involves providing a glassy polymer composition on a conveyor means which carries the sample at a selected speed in order to pass underneath an electron beam processor. Preferably, the electron beam processor allows for a uniform irradiation over the surface of the glassy polymer composition. The depth of penetration of radiation into the sample, the dose rate of radiation and the total irradiated dosage can be controlled by the accelerating voltage of the beam, the beam current, and the line speed of the conveyor. If desired it is particularly desirable and convenient to cover the glassy polymer composition with a second layer of a polymeric material in order to provide a sharp gradient of the irradiated dosage across the depth of the glassy polymer composition. The type and thickness of the second layer of polymeric material depends upon factors such as the depth of penetration of radiation from the electron beam processor into the glassy polymer composition.

The glassy polymer composition which can have a functionally effective amount of crosslinking is subjected to crazing. By the term "crazing" is meant the formation of a microporous polymer structure (e.g., a finely divided microporous polymer structure) by the action such as a solvent material, with or without the application of external stress. For example, such crazing can occur in the presence of external mechanical stress in glassy polymer compositions of low orientation, or in the absence of external mechanical stress in glassy polymer compositions of high orientation. Typically, the glassy polymer composition is solvent crazed. The selection of the solvent, time of treatment and temperatures for the crazing process depends upon the polymer which is being crazed. Typically, crazing solvents are those solvents which provide a microporous character to the glassy polymer composition. Suitable crazing solvents include organic solvents which are at least partially soluble in the glassy polymer composition, (i.e., those solvents whose solubility parameters are not too different from that of the glassy polymer composition). However, the glassy polymer composition should not dissolve in the solvent. Examples include aliphatic hydrocarbons, including hexane and heptane; the halocarbons including dichloromethane; the aliphatic ethers including methyl ethyl ether; and the carbonyl containing solvents such as acetone and methyl ethyl ketone; solvents such as dimethylsulfoxide; and the like. Combinations of solvents can be employed. Vapors of the crazing solvent can be employed to achieve the desired crazing. See, E. J. Kramer, *Developments in Polymer Fracture I*, ed. by E. H. Andrews, published by Applied Science Publishers, Inc., (1979); which is incorporated herein by reference. Typically, the pore dimension of the microporous layer formed by the crazing ranges from about 50 Å to about 100 μm.

The monomer which is employed in the process of this invention is typically one which is capable of undergoing free radical polymerization. Examples of suitable monomers include a wide variety of ethylenically unsaturated monomers. Examples of such monomers include the alkyl esters of ethylenically unsaturated carboxylic acids such as the acrylates which include methyl acrylate, ethyl acrylate, butylacrylate, 2-ethylhexyl acrylate, lauryl acrylate, and the like; the methacrylates which include methyl methacrylate, lauryl methacrylate, and the like; the hydroxyalkyl acrylates and methacrylates; $\alpha\beta$-ethylenically unsaturated aromatic compounds such as styrene, $\alpha$-methyl styrene, vinyl toluene, halogenated styrenics, and the like; vinyl acetate; vinyl chloride and vinylidene chloride; acrylonitrile; conjugated dienes such as 1,3-butadiene; fluorinated monomers; hydroxy alkyl acrylates; the alkyleneoxy containing monomers such as those polyethyleneoxy vinyl benzyl ethers; polyethyleneoxy containing compounds such as are prepared from the reaction of polyethyleoxy alcohols with acrylic acid, methacrylic acid, acrylamide and methacrylamide; and the like. Ionizable monomers such as acrylic acid, methacrylic acid, dimethylaminoethyl methacrylate, acrylamido-2-methylpropane sulfonic acid, and the like can be employed.

The choice of monomer can depend upon a variety of factors depending upon the membrane properties which are desired. For example, monomers having a hydrophilic character can provide a character to the surface region of the membrane composition and/or the surface region of the micropores and/or to the micropores, which character provides a hydrophilicity, wettability or paintability to the membrane composition. In particular, a membrane composition can be provided which comprises a wettable surface region and which exhibits relatively good adhesive properties. In addition, membrane compositions such as those which are provided with a hydrophilic character to the surface region of the micropores are particularly useful in filtration applications such as where aqueous liquids are filtered. Furthermore, various monomers having a charged character can be employed in order to provide characteristics for use in electrostatic filtration applications.

Monomers having a hydrophobic character can provide a character to the surface region of the membrane composition and/or the surface region of the micropores and/or to the micropores, which character provides a membrane composition with unique properties which are desirable for use in membrane distillation applications. For example, the desired selectivity of the membrane composition can be provided by altering factors such as the amount of crazing and amount of monomer employed, the depth of treatment into the membrane composition with monomers, the type of monomer employed, and the like. In another aspect, monomers can be polymerized in order to form a polymeric domain grafted to at least a portion of the microporous domain, which polymeric domain provides functional groups to the surface region of the pores comprising said microporous domain. Such functional groups can comprise, for example, anionic or cationic moieties.

The aforementioned monomers which are employed in the process of this invention can be contacted with the polymer composition in a variety of ways including in liquid form or vapor form, as a mixture of monomers, in a solvent for the monomer which solvent is not a particularly effective crazing solvent, or in a crazing solvent. The amount of solvent relative to the amount of monomer can vary over a wide range, and can be determined by experimentation. That is, the composition of the monomer/solvent mixture can be readily optimized such that desirable amounts of crazing occur during contact of the mixture with the glassy polymer composition. Typically, a balance between crazing and grafting should be obtained such that an undesirable over-crazing and/or swelling of the polymer composition does not occur. For example, a monomer such as methyl methacrylate can be employed as a monomer for grafting, but is too good a solvent for crazing a glassy polymer composition such as polystyrene. Thus, it is possible to combine the methyl methacrylate monomer with a solvent such as an alcohol which does not readily craze the polystyrene. The methyl methacrylate/alcohol mixture causes crazing and grafting to the polystyrene.

The solvent (i.e., the solvent for the monomer and/or the crazing solvent) is removed from the membrane composition using a variety of techniques. Most desiraby, the membrane composition is subjected to vacuum treatment in order to evaporate off the solvent.

If desired, the membrane composition can be subjected to a further amount of crosslinking. This can be readily accomplished by subjecting the composition to irradiation for a period of time which can vary. Typically, it is desirable to subject the composition to irradiation using, for example, electron beam radiation for a period of time which is relatively short.

The membrane compositions of this invention exhibit high physical strengths which is believed to be due to the crosslinking which is present in the glassy polymer composition. In addition, the rate of crazing is typically a function of the amount of crosslinking which is present in the glassy polymer composition. Thus, by controlling the crosslinking such that said crosslinking is orientated towards one surface of the glassy polymer composition, it is possible to control the crazing such that the dense domain, when present, is orientated towards one surface of the membrane composition. That is, a type of asymmetric membrane can be formed. Without the crosslinking treatment of the glassy polymer composition or with substantially equal crosslinking treatment on each surface of the glassy polymer composition, the dense layer, when present, will typically be located near the center of the membrane composition. Such membrane compositions typically exhibit high polarization effects.

If desired, asymmetric membrane compositions can be prepared using the process of this invention and are contemplated as being useful in applications where a membrane composition having a dense layer at or very near one surface and the grafted microporous region at or near the other surface. For example, asymmetric membrane compositions are often desirable for use in applications such as in the separation of dense gases and in the separation of dense liquids. That is, in certain applications, it is particularly desirable to have the dense layer of the membrane composition as near as possible to the upstream side of the membrane composition in order to minimize the effects of undesirable concentration gradients that adversely influence the efficiency of the separation process.

The process of this invention allows the skilled artisan to prepare effectively and efficiently membrane compositions which can have polymer grafts directly thereto. In particular, the process of this invention is more desirable in preparing membrane compositions than compositions which are prepared by grafting polymers to a membrane composition using emulsion or solution techniques and typical initiators. That is, the process of this invention is believed to provide a graft of polymer directly to the glassy polymer composition, and the effective absence of typical initiator fragments in the resulting membrane composition of this invention is believed to provide a membrane composition with desirable color stability and thermal stability.

Membrane compositions of this invention can be employed in the form of asymmetric membrane compositions containing, for example, a dense discriminating layer and a porous layer. Such asymmetric membrane compositions are useful in reverse osmosis processes, in gas separation, and in liquid separations including prevaporation processes and in chlor-alkali membrane applications. Such membrane compositions which are prepared according to the process of this invention can be readily fabricated in order to provide a membrane having good mechanical properties as well as a desired selectivity. In addition, the process of this invention allows the skilled artisan to effectively and efficiently provide dual functionality membranes.

Membrane compositions of this invention can be employed as porous membranes for use in composite membrane materials. For example, in the preparation of thin film composites wherein a discriminating layer is cast over a porous support, the functional groups which are present on the surface region of the porous membrane can provide an adhesive nature in order to provide improved adhesion of the discriminating layer to the porous support. Such membrane compositions are useful in reverse osmosis processes, in gas separation, and in liquid separations including pervaporation processes and in chlor-alkali membrane applications. In addition, composite membrane materials which contain liquids immobilized in a porous support can be prepared. For example, functional groups which are present on the surface region of pores can improve the lifetime of liquid membranes by improving the adhesive nature of the liquid and porous support.

Membrane compositions of this invention can be employed as porous membranes for use in filtration and membrane distillation applications. For example, the functional groups which are present on the surface region of the pore can make the filter more water wettable. In certain instances the presence of charged groups on the surface region of the pores can provide useful compositions for electrostatic filtering applications (e.g., as in filtering negatively charged bacteria from a liquid). In other instances such as in membrane distillation applications functionalities having a substantially non-water wettable character are desirable.

The dried membranes are particularly effective in the separation of gaseous mixtures, with good permeation rates and selectivities. Representative of such gaseous mixtures are those found in a wide variety of industrial exhaust streams. In addition, the dry membranes can be used for the separation rapidly diffusing gas from less permeable gases.

The following examples are presented to further illustrate but not limit the scope of this invention. All parts and percentages are by weight unless otherwise indicated.

EXAMPLE 1

A membrane composition is prepared by partially crazing a 51 μm thick polystyrene film (sold commercially as Trycite* 1000 polystyrene film by The Dow Chemical Company). The crazing of the film is performed by placing said film in a solvent mixture containing 80 percent ethanol and 20 percent distilled methyl methacrylate, purging the mixture for 1 minute with nitrogen and allowing the mixture to set at 32° C. for 7.5 hours. The solvent is removed and a whitened film is observed. The film is extracted with ethanol at about 20° C. overnight, and dried in a vacuum oven at 50° C. The film contains grafted methyl methacrylate groups.
*Trademark of The Dow Chemical Company The film is heated in a vacuum oven at 120° C. for 4 hours. The film continues to contain grafted methyl methacrylate groups.

EXAMPLE 2

A membrane composition is prepared by irradiating one side of a 51 μm thick polystyrene film using electron beam (EB) radiation (i.e., using a CB150/15/10L electrocurtain electron beam processor with 150 KV accelerating voltage). During the 40 megarad dose of radiation, another piece of 100 μm thick polystyrene film is placed on top of the irradiated sample. The irradiated sample is placed in a solvent mixture as described in Example 1. The sample is extracted with ethanol and oven dried, as described in Example 1. The contains about 3.4 percent grafted methyl methacrylate in polymerized form.

What is claimed is:

1. A process for providing a polymer composition suitable for use as a membrane composition, said polymer composition comprising at least one region having a microporous structure, said process comprising
   (a) providing a glassy polymer composition optionally having a functionally effective amount of crosslinking, and
   (b) providing said membrane composition by crazing the glassy polymer composition in an amount sufficient to provide to the glassy polymer composition at least one microporous domain, wherein
   (c) said glassy polymer composition is crazed in the presence of monomers which graft polymerize with said glassy polymer composition during said crazing.

2. The process of claim 1 wherein said glassy polymer composition has a functionally effective amount of crosslinking.

3. The process of claim 2 wherein said crosslinking is provided by irradiating the glassy polymer composition.

4. The process of claim 3 wherein there is provided a sharp gradient of irradiated dosage across the thickness of the glassy polymer composition.

5. The process of claim 1 wherein said polymer composition comprises in addition to said microporous domain a dense domain which is in the form of a continuous layer.

6. The process of claim 1 wherein said glassy polymer composition comprises a glassy polymer phase and a rubbery phase.

7. The process of claim 1 wherein said glassy polymer composition comprises a slightly crystalline character.

8. The process of claim 1 wherein said glassy polymer composition is solvent crazed.

9. The process of claim 8 wherein said solvent is selected from the aliphatic hydrocarbons, the halocarbons, the aliphatic ethers, carbonyl containing solvents and alcohols.

10. The process of claim 1 wherein said membrane composition is an asymmetric membrane.

11. The process of claim 1 wherein said membrane composition is a porous membrane.

12. The process of claim 8 wherein said solvent comprises a mixture of monomer and another solvent.

13. The process of claim 12 wherein said solvent comprises a mixture of methyl methacrylate and an alcohol.

14. The process of claim 1 wherein said glassy polymer composition is selected from polystyrene, acrylonitrile butadiene styrene resins, styrene acrylonitrile copolymers and styrene acrylic acid copolymers.

15. A membrane composition comprising at least one microporous domain; said membrane composition being comprised of (a) a glassy polymer composition optionally comprising a functionally effective amount of crosslinking, and (b) a polymeric domain grafted to at least a portion of the microporous domain of said polymer composition.

16. The membrane composition of claim 15 wherein said glassy polymer composition has a functionally effective amount of crosslinking.

17. The membrane composition of claim 15 comprising in addition to said microporous domain a dense domain wherein said dense domain is in the form of a continuous layer.

18. The membrane composition of claim 15 wherein said glassy polymer composition comprises a glassy polymer phase and a rubbery phase.

19. The membrane composition of claim 15 wherein said glassy polymer composition comprises a slightly crystalline character.

20. The membrane composition of claim 15 wherein said membrane composition is an asymmetric membrane.

21. The membrane composition of claim 15 wherein said membrane composition is a hydrophobic porous membrane.

22. The membrane composition of claim 15 wherein said membrane composition is a hydrophilic porous membrane.

23. The membrane composition of claim 15 wherein said glassy polymer composition is selected from polystyrene, acrylonitrile butadiene styrene resins, styrene acrylonitrile copolymers and styrene acrylic acid copolymers.

24. The membrane composition of claim 17 wherein said dense domain is in the form of a layer having a thickness ranging from 0.1 $\mu$m to about 25 $\mu$m.

25. The membrane composition of claim 15 wherein said glassy polymer composition has a total thickness ranging from 5 $\mu$m to about 300 $\mu$m.

26. The membrane composition of claim 17 wherein the thickness of said dense domain(s) ranges from 0 to about 50 percent of the total thickness of the untreated glassy polymer composition.

27. The membrane composition of claim 15 wherein said polymeric domain grafted to at least a portion of the microporous domain provides functional groups to the surface region of the pores comprising said microporous domain.

28. The membrane composition of claim 15 wherein said polymeric domain grafted to at least a portion of the microporous domain comprises the polymerization product of alkyl esters of ethylenically unsaturated carboxylic acids, $\alpha\beta$-ethylenically unsaturated aromatic compounds and conjugated dienes.

29. The membrane composition of claim 15 wherein said polymeric domain grafted to at least a portion of the microporous domain comprises the polymerization product of methyl methacrylate.

* * * * *